(No Model.) 3 Sheets—Sheet 1.
C. ADAM.
MECHANICAL TOY.
No. 538,007. Patented Apr. 23, 1895.
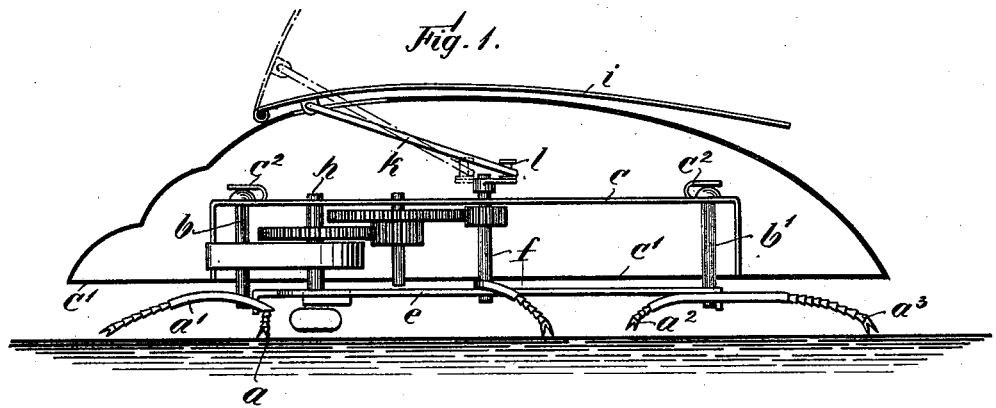
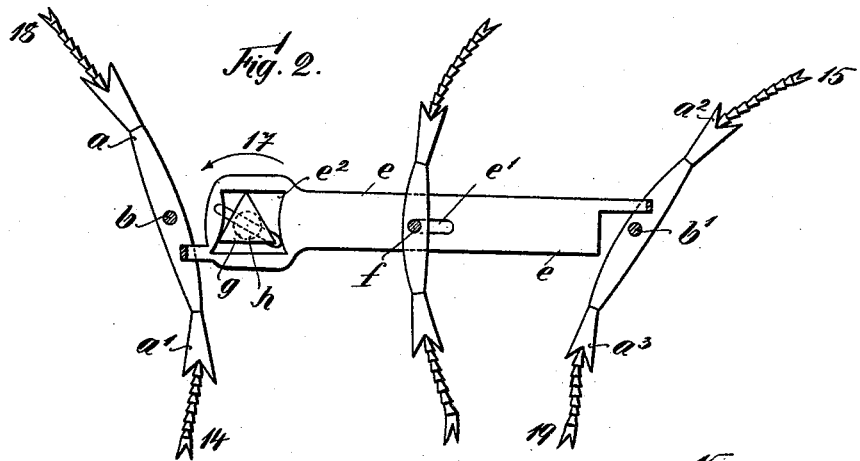
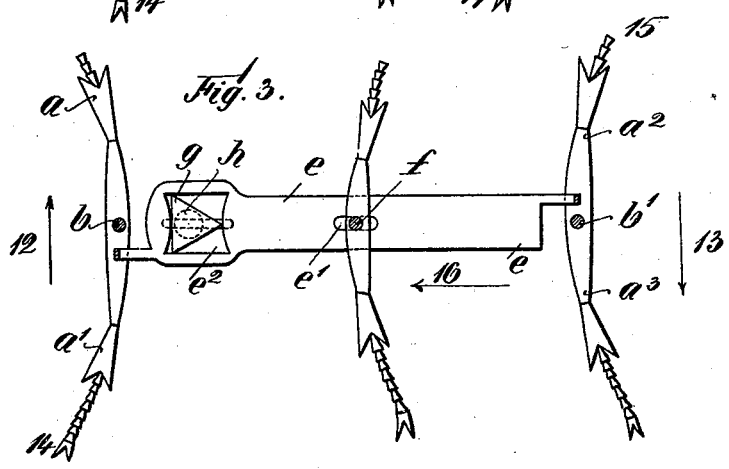
Witnesses
Johannes Irrmisch
Carl Rofsbach
Inventor
Carl Adam
by
Attorney (No Model.)

C. ADAM.
MECHANICAL TOY.

No. 538,007.

3 Sheets—Sheet 2.

Patented Apr. 23, 1895.

Witnesses
Johannes Irmisch
Carl Rofsbach

Inventor
Carl Adam
by
Robert Taylor
Attorney (No Model.) 3 Sheets—Sheet 3.
C. ADAM.
MECHANICAL TOY.
No. 538,007. Patented Apr. 23, 1895.
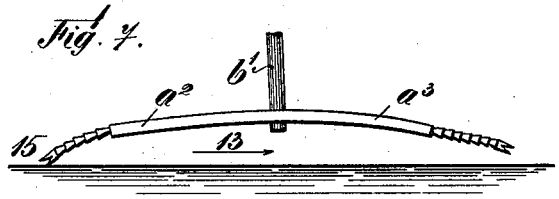
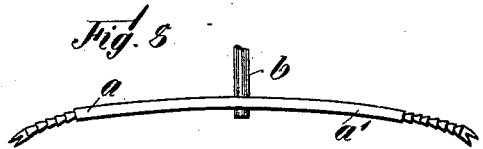
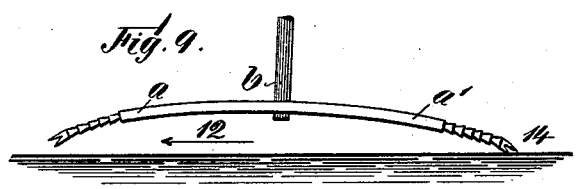
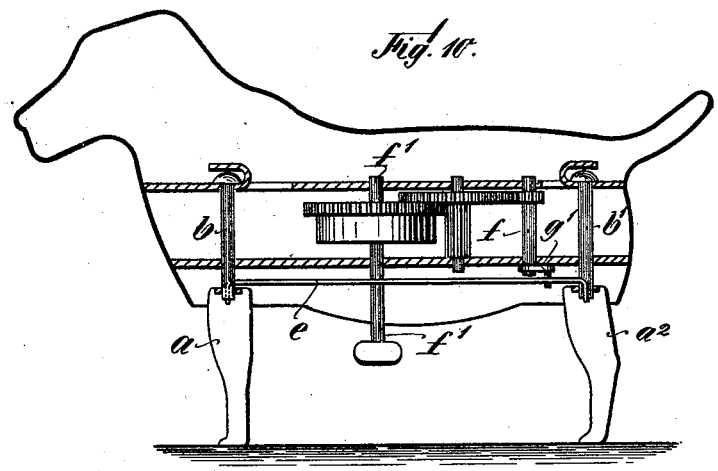
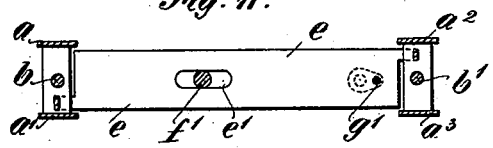
Witnesses
Johannes Frimisch
Carl Rofsbach
Inventor
Carl Adam
by
Attorney.

UNITED STATES PATENT OFFICE.

CARL ADAM, OF KÖNIGSBERG, GERMANY.

MECHANICAL TOY.

SPECIFICATION forming part of Letters Patent No. 538,007, dated April 23, 1895.

Application filed May 9, 1894. Serial No. 510,672. (No model.)

*To all whom it may concern:*

Be it known that I, CARL ADAM, a subject of the King of Prussia, German Emperor, and a resident of Königsberg, in the Kingdom of Prussia, German Empire, have invented an Improved Mechanical Toy Imitating a Creeping or Running Animal, of which the following is an exact specification.

This invention refers to a toy representing an animal the motion of which is effected directly by its legs. In the similar toys known up to now, in which the legs were also caused to move, this movement did not cause that of the whole animal, but was provided only to increase the illusion. The animal was moved then by wheels driven by a wheel-work arranged within the hollow body of the animal, said wheel-work effecting also the to-and-fro motion of the legs.

In my improved construction, wheels for moving the animal forward are dispensed with. The wheel-work acts only on the legs, in such a manner, however, that the same are not only moved forward and backward, but are at the same time lifted and lowered, these movements being so alternating that the motion of the animal is effected thereby.

In order to make my invention more clear, I refer to the accompanying drawings, in which similar letters and numerals denote similar parts throughout the different views, and in which—

Figure 4:
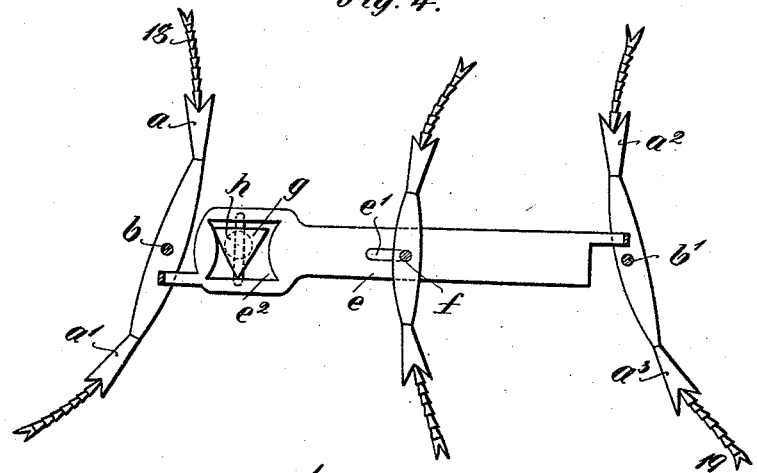
Figure 5:
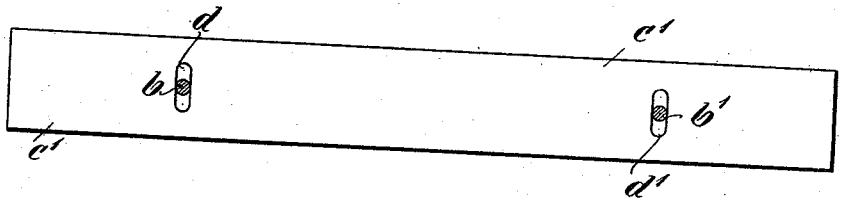
Figure 6:
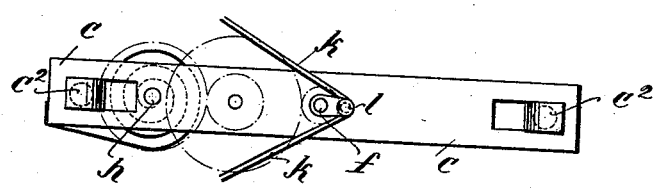

Figure 1 shows a vertical longitudinal section through the improved toy. Figs. 2, 3 and 4 show three different positions of the movable legs with their connecting-slide, the upper part of the body being removed. Figs. 5 and 6 show details of the construction. Figs. 7, 8 and 9 show front-views of the movable pair of legs, corresponding to the Figs. 2, 3 and 4. Figs. 10 and 11 are modifications.

The drawings show two modes of execution, one (Figs. 1 to 9) representing a creeping, the other, (Figs. 10 and 11) a going animal. There are provided in each of these cases two pairs of movable legs, which are coupled by a slide-like organ serving at the same time to transfer the movements of the source of force (the wheel-work within the body) to said legs. The latter are operated in such a manner, that those on the same side of the body always move in opposite directions, and that those which move forward are raised during this time, while the other legs moving relatively backward remain with their feet on the ground.

Referring to Figs. 1 to 4, $a$ $a'$ and $a^2$ $a^3$ are the two movable pair of legs, which are firmly connected with the pivots or axles $b$ $b'$, arranged in the frame $c$ $c'$. The peculiar arrangement of these axles forms a very essential part of this invention, in that the said axles may not only turn, but may also swing sidewise in the manner of pendulums. The axles or pendulums $b$ $b'$ are held in the frame part $c$ by projections $c^2$, Figs. 1 and 6, punched out of said part $c$, and are guided at their free ends by slots $d$ $d'$, Fig. 5, provided in the frame-part $c'$. If, thus, the pendulum-axles $b$ $b'$ are caused to swing, the two feet forming the pair $a$ $a'$ or $a^2$ $a^3$ will be alternately lifted and lowered. (Compare Figs. 7 and 9.)

The two pairs $a$ $a'$ and $a^2$ $a^3$ of the legs are connected by a slide-like organ $e$, Figs. 1 to 4, which is guided by aid of a slot $e'$, Fig. 3, on the lower projecting end of an axle $f$ of the wheel-work. Slide $e$ may be displaced lengthwise, as well as turned on pivot $f$, both movements being imparted to the slide by a triangle $g$ fixed to the main-axle $h$ of the wheel-work, and taking into a cutting-out $e^2$, Fig. 3, of said slide. The turning of the slide is but a slight one, only as small as necessary for swinging each of the pendulum axles from its one end-position, Fig. 7, into its other end-position, Fig. 9, by virtue of which movements either the legs $a$ and $a^3$ or $a'$ and $a^2$ are lifted or lowered simultaneously. While being lifted and again lowered, the respective legs are moved forward by the axial displacement of slide $e$, this displacement being also effected by the action of triangle $g$ on the slide. Each pair of legs then represents a one-armed lever, the fulcrum of which is formed by that foot which remains on the ground. (Compare 14 in Figs. 3 and 9 and 15 in Figs. 3 and 7.)

If the position of the pendulum $b$ or $b'$ with the legs $a$ $a'$ or $a^2$ $a^3$ is in the middle between that of Fig. 7 and that of Fig. 9, the pendulum-axles stand vertical, Fig. 8, their lower portions being in the middle of the slots $d$ $d'$ Fig. 5. Suppose now, axle $b$ be oscillated in the direction of arrow 12, Figs. 3 and 9, leg $a$ will be lifted, while leg $a'$ remains on the ground, and supports alone now the weight of the fore part of the body. Axle $b'$ is, however, at the same time oscillated in opposite direction, i. e., in the direction of arrow 13, Fig. 7, so that leg $a^3$ is lifted, while leg $a^2$ remains on the ground. The whole animal is, thus, supported at the points 14 and 15, Figs. 2 and 3, the latter being diagonally opposite to each other. If, now, all parts are in the position shown in Fig. 3, and if slide $e$ is displaced then by triangle $g$ in the direction of arrow 16, the pairs $a\ a'$ and $a^2\ a^3$ will be turned like one-armed levers on the points 14 and 15, so that the body of the animal is moved forward, and the movable legs get the position shown in Fig. 2. Triangle $g$ rotating in the direction of arrow 17, Fig. 2, causes now the slide to turn a little on pivot $f$, so that the position of the pendulums is reversed, i. e., the latter are swung to the other side. There are, therefore, the legs $a$ and $a^3$ lowered, and the legs $a'$ and $a^2$ lifted. The fulcrums for the one-armed levers $a\ a'$ and $a^2\ a^3$ are transferred, thus, from the points 14 and 15 to the points 18 and 19, Fig. 2, so that on the next displacement of slide $e$, the respective parts are moved from the position shown in Fig. 2 into that shown in Fig. 4. By the alternation and co-operation of the said two motions, i. e., the longitudinal displacement of slide $e$ with its action on the horizontal movement of the legs, and the turning of that slide with its action on the vertical movement of the legs by the mediation of the pendulum axles, the animal is moved forward directly by its legs without the employment of wheels running on the ground.

In order to retard the movement of the animal, so that it moves but slow like a creeping chafer, and at the same time to increase the illusion, I prefer to make the wings of the chafer movable, and to connect them with the wheel-work, as shown in Figs. 1 and 6. Shaft $f$ of the wheel-work is in this case provided with a crank $l$ connected by rods $k$ with the wings $i$. This crank when rotating causes the wings to swing up and down.

The arrangement of parts above described with regard to an animal with horizontal or nearly horizontal legs, may be employed also for animals with upright legs, as represented as an example in Fig. 10. Instead of using in this case a triangle for operating slide $e$, I may employ a crank $g'$, Figs. 10 and 11, secured to the lower end of shaft $f$, and taking into the rear part of the slide the fulcrum and guide for the latter are formed in this case by the main-shaft $f'$. The manner of working of this mode of execution is exactly the same as above described, and needs no further explanation.

Having thus fully described the nature of this invention, what I desire to secure by Letters Patent of the United States is—

In a toy representing a creeping or going animal, the combination with two pairs $a\ a'$, and $a^2\ a^3$ of movable legs, of two axles $b\ b'$ carrying the latter, and being adapted to be turned as well as oscillated sidewise like pendulums in slots $d\ d'$ of the frame, together with said legs, leg $a'$ being connected with leg $a^2$ by a slide $e$ having a slot $e'$, and embracing with the latter a pivot $f$ adapted to form the fulcrum as well as the guide for said slide, the latter being operated from a wheel work, arranged within the body of the animal, by a revolving projection taking into said slide, substantially as described.

In testimony whereof I have signed this specification in the presence of two subscribing witnesses.

CARL ADAM.

Witnesses:
ARTHUR FAMLAND,
CARL VINEY, Jr.